Nov. 27, 1956 F. D. LOW 2,771,894

CONTROL CIRCUITS FOR DISHWASHING APPARATUS

Filed Nov. 29, 1955 2 Sheets-Sheet 1

INVENTOR.
Frank D. Low
BY
Smith, Olsen, Baird & Miller
Attys.

CONTROL CIRCUITS FOR DISHWASHING APPARATUS
Filed Nov. 29, 1955 2 Sheets-Sheet 2
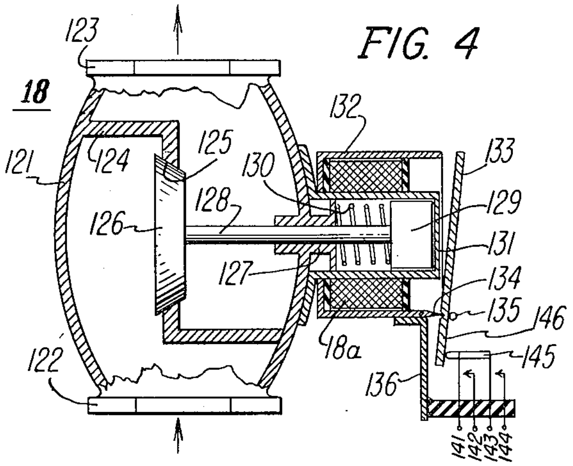
FIG. 4
FIG. 5
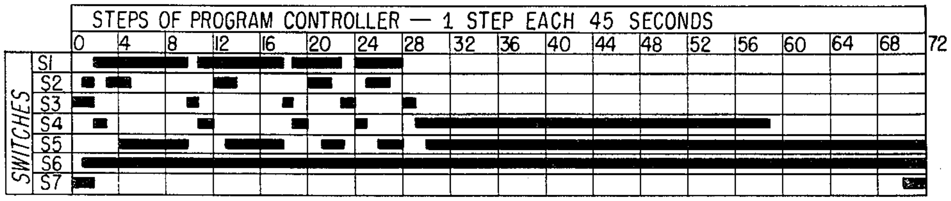
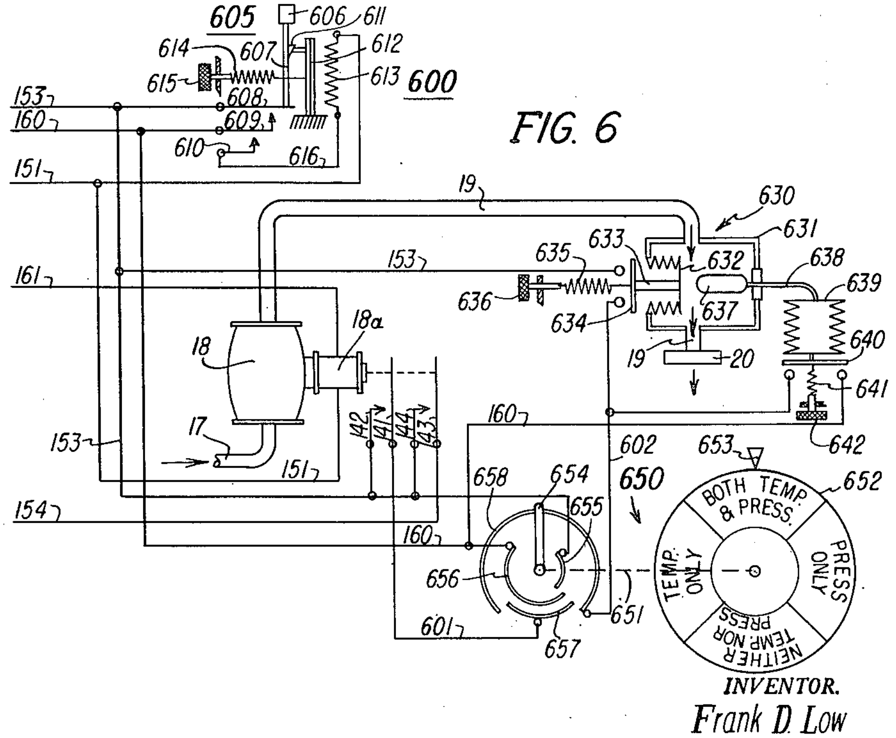
FIG. 6
INVENTOR.
Frank D. Low
BY
Smith, Olsen, Baird & Miller
Attys.

United States Patent Office 2,771,894

Patented Nov. 27, 1956

2,771,894

CONTROL CIRCUITS FOR DISHWASHING APPARATUS

Frank D. Low, La Grange Park, Ill., assignor to General Electric Company, a corporation of New York Application November 29, 1955, Serial No. 549,599

16 Claims. (Cl. 134—57)

The present invention relates to control circuits for dishwashing apparatus; and it is the general object of the invention to provide such a control circuit incorporating an improved instant start arrangement that is governed by a manually operable pushbutton, or the like.

Another object of the invention is to provide a control circuit of the character noted, that utilizes in the instant start arrangement thereof the solenoid of the valve that governs the introduction of water into the vat of the dishwashing apparatus, thereby achieving simplification of the control circuit by eliminating a separate pickup or start relay, as is usually provided in such control circuits.

A further object of the invention is to provide in a control circuit of the character described, incorporating a cyclically operative program controller for governing the washing cycle that is carried out in the vat of the dishwashing apparatus, an improved check arrangement for preventing cyclic operation of the program controller in the event of an unstandard condition of the water that is introduced into the vat of the dishwashing apparatus.

A further object of the invention is to provide a control circuit of the character described, wherein the check arrangement is responsive to the pressure of the water that is introduced into the vat of the dishwashing apparatus, so as to block the cycle of the program controller in the event of an undesirable low pressure of the water supply system.

A further object of the invention is to provide a control circuit of the character described, wherein the check arrangement is responsive to the temperature of the water that is introduced into the vat of the dishwashing apparatus, so as to block the cycle of the program controller in the event of an undesirable low temperature of the water supply system.

A still further object of the invention is to provide a control circuit of the character described, that is of simplified connection and arrangement, so as to achieve economy of manufacture and reliability of operation.

Further features of the invention pertain to the particular arrangement of the elements of the control circuit for the dishwashing apparatus, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 4 is an enlarged fragmentary vertical sectional view of an electro-responsive combined water control valve and control switch that is embodied in the dishwashing apparatus of Figs. 1 and 2 and incorporated in the control circuit of Fig. 3;

Fig. 5 is a combined time-sequence operation chart of the elements incorporated in the control circuit of Fig. 3; and Fig. 6 is a diagrammatic illustration of a fragmentary portion of a modified form of the control circuit of Fig. 3.

Figures 1, 2, 3:
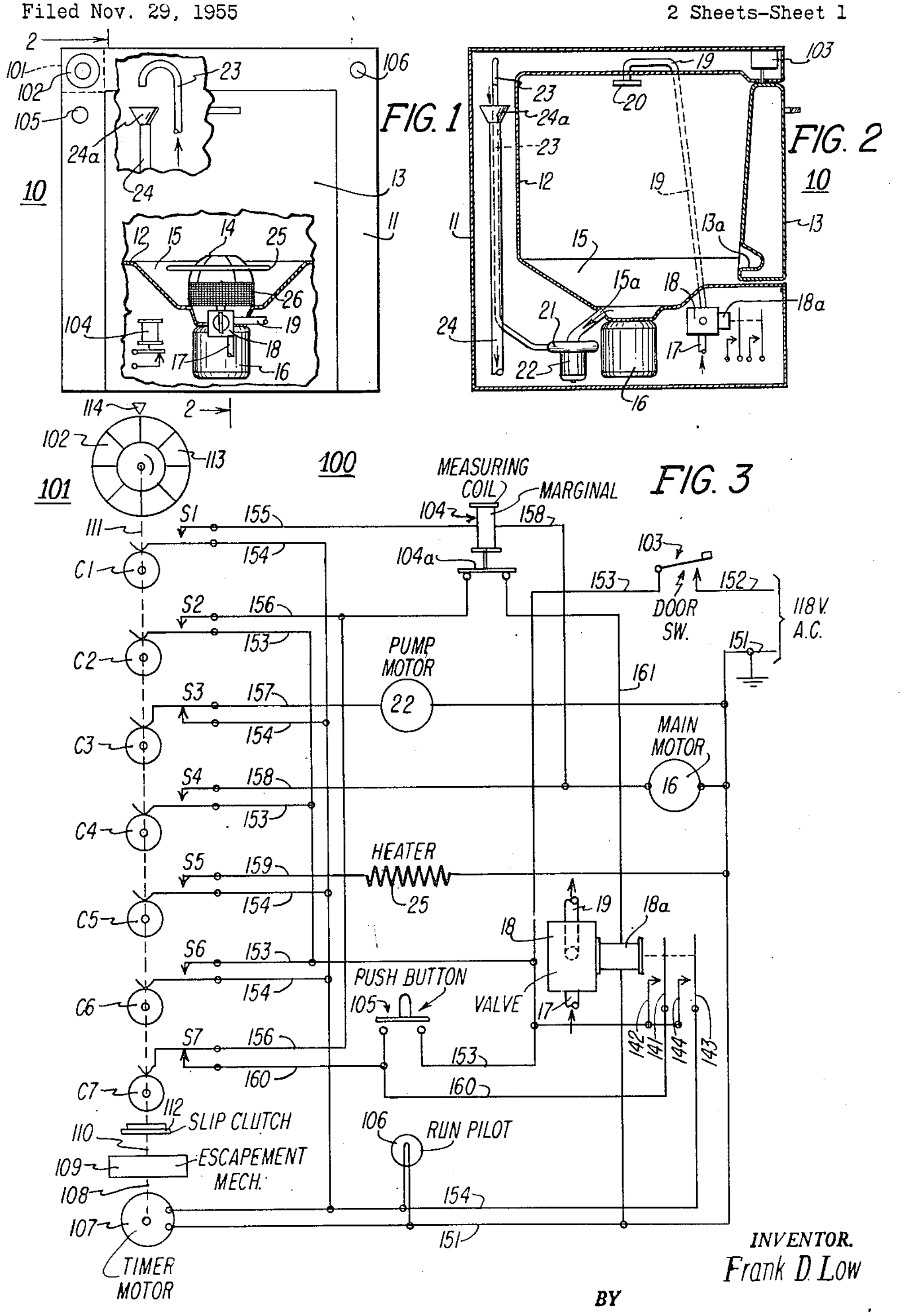
Figure 1 is a front elevational view, partly broken away, of dishwashing apparatus incorporating a control circuit embodying the present invention.
Fig. 2 is a vertical sectional view of the dishwashing apparatus, taken in the direction of the arrows, along the offset lines 2—2 in Fig. 1.
Fig. 3 is a diagrammatic illustration of the control circuit incorporated in the dishwashing apparatus shown in Figs. 1 and 2.

Referring now to Figs. 1 and 2 of the drawings, there is generally illustrated dishwashing apparatus 10 of the character of that disclosed in U. S. Patent No. 2,620,811, granted on December 9, 1952, to Forrest A. Walker, and incorporating a control circuit embodying the features of the present invention. The apparatus 10 comprises an upstanding cabinet 11 housing an upstanding vat 12, the cabinet 11 and the vat 12 being provided with aligned upstanding front openings therein that are, in turn, provided with an upstanding front door 13. The front door 13 is pivotally mounted adjacent to the lower edge thereof within the lower front opening of the vat 12 and is movable between a substantially vertical closed position and a substantially horizontal open position. A pocket 13*a* is formed in the lower central portion of the inner wall of the front door 13 and arranged to receive a quantity of detergent that is employed in the washing of the dishes. Also, the apparatus 10 comprises removable rack structure, not shown, that is adapted to support dishes and other utensils within the vat 12 for washing purposes, the rack structure being movable into and out of the vat 12 through the front openings when the front door 13 occupies its open position. An impeller 14 is arranged within a sump 15 formed in the bottom of the vat 12 and is rotated by an associated electric drive motor 16 disposed below the bottom of the vat 12 for the purpose of producing a washing action within the vat 12, when the front door 13 occupies its closed position and wash water is contained in the sump 15.

For the purpose of supplying wash water to the vat 12, there is provided an inlet conduit 17 that is adapted to be connected to a suitable water supply system, such, for example, as a hot water tank, by intervening pipe, not shown. The inlet conduit 17 communicates with the inlet port of a valve 18; and the outlet port of the valve 18 communicates with a conduit 19 that is connected to a spray device 20 arranged substantially centrally in the top of the vat 12. The valve 18 is normally biased into its closed position and is operated therefrom into its open position by an associated solenoid 18*a*; whereby the hot water from the inlet conduit 17 is sprayed downwardly from the spray device 20 through the vat 12, when the valve 18 occupies its open position with the solenoid 18*a* in its energized condition. When the solenoid 18*a* is subsequently deenergized, the valve 18 is returned back into its closed position in order to cut-off the supply of hot water to the spray device 20.

A drain opening 15*a* is provided in the bottom of the sump 15 and communicates with the intake port of a drain pump 21 that is driven by an associated electric motor 22, the pump 21 and the motor 22 being disposed below the bottom of the vat 12 adjacent to the motor 16. The drain pump 21 is also provided with a discharge port that communicates with a conduit 23 that, in turn, communicates with a drain conduit 24 that is connected to drain plumbing, not shown. The conduits 23 and 24 are arranged in upstanding relation between the rear walls of the cabinet 11 of the vat 12, the outer end of the conduit 23 being downwardly turned and separated by a gap from the adjacent upper end of the conduit 24, the extreme upper end of the conduit 24 being provided with a funnel-like structure 24*a* disposed below the outer or discharge end of the conduit 23 so as to provide the previously-mentioned gap therebetween. When the drain pump 21 is at rest, water introduced into the vat 12 is accumulated in the sump 15; and when the drain pump 21 is operated by the motor 22, the water accumulated in the sump 15 is removed therefrom via the drain opening 15a, and discharged via the conduit 23 into the drain conduit 24, from whence it is removed to the exterior via the drain plumbing, not shown.

Also, an electric heating unit 25 is arranged in the sump 15 in spaced-apart surrounding relation with respect to the impeller 14; which heating unit 25 is preferably of the sheathed helical resistance conductor type disclosed in U. S. Patent No. 1,367,341, granted February 1, 1921 to Charles C. Abbott. Also, a reticulated screen 26 is arranged in the bottom of the sump 15 in surrounding relation with respect to the impeller 14 for the purpose of preventing soil accumulating in the sump 15 from being thrown by the operating impeller 14 back into the supported dishes in a washing operation.

Further, the dishwashing apparatus 10 comprises a control circuit 100, shown in Fig. 3, that includes a program controller 101 that is housed between the cabinet 11 and the vat 12, the program controller 101 being provided with a manually operable control knob or dial 102 disposed adjacent to the upper left-hand front of the cabinet 11 and readily accessible from the exterior. Also, the control circuit 100 comprises a door switch 103 housed between the cabinet 11 and the vat 12 and selectively operated in response to opening and closing of the front door 13, a measuring coil 104 arranged below the bottom of the sump 15, a pushbutton switch 105 housed between the cabinet 11 and the vat 12 and disposed below the control knob 102 and readily accessible from the exterior, as well as a pilot lamp 106 also housed between the cabinet 11 and the vat 12 and disposed adjacent to the upper right-hand front of the cabinet 11 and readily visible from the exterior.

As illustrated in Fig. 3, the program controller 101 comprises a synchronous timer motor 107 preferably of the "Telechron" type provided with a drive shaft 108 that is connected to escapement mechanism 109 having a drive shaft 110. The program controller 101 further comprises a rotatably mounted operating shaft 111, the outer end of which carries the manually operable knob 102, that is provided with a skirt 113 carrying indicia, not shown, that cooperates with an index marker 114 carried by the front of the cabinet 11; whereby the cooperation between the indicia mentioned carried by the skirt 113 and the index marker 114 indicates the progress of the washing cycle, as explained more fully hereinafter. Also, the operating shaft 111 carries seven insulating control cams C1 to C7, inclusive, that respectively cooperate with seven sets of switch springs S1 to S7, inclusive; and finally, the inner end of the operating shaft 111 and the outer end of the drive shaft 110 are operatively interconnected by a slip cluch 112 of the friction plate type. In the arrangement, the operating shaft 111 may be rotated independently of the drive shaft 110 by the manual dial 102 by virtue of the interposition of the slip clutch 112; and when the timer motor 107 is operating, the drive shaft 110 is driven step-by-step on a time basis as a result of the operation of the escapement mechanism 109 so that the operating shaft 111 is correspondingly driven step-by-step by the drive shaft 110 through the slip clutch 112. Specifically, the escapement mechanism 109 is so constructed and arranged that the drive shaft 110 is driven through a small angle of about 5° in each step each 45 seconds.

Referring now to Fig. 4, the valve 18 constitutes a combined water control valve and control switch, and comprises a valve casing 121 provided with an inlet port 122 that is connected to the conduit 17 and an outlet port 123 that is connected to the conduit 19, as well as an interior dividing wall 124 having a valve port 125 therein with which a valve element 126 cooperates. More particularly, the valve casing 121 is provided with a laterally extending tubular projection 127 in which there is slidably mounted a valve stem 128 that carries on its inner end the valve element 126 and that carries on its outer end a plunger 129, the valve element 126 being biased into its closed position with respect to the valve port 125 by a coil spring 130 arranged in compression between the outer end of the tubular projection 127 and the inner end of the plunger 129. The coil spring 130 is arranged in surrounding relation with respect to the outer end of the valve stem 128; and the tubular projection 127, the coil spring 130 and the plunger 129 are housed within a substantially tubular cup-shaped casing 131 projecting laterally from the valve casing 121 and sealed thereto. The solenoid 18a is arranged in surrounding relation with respect to the tubular casing 131 and positioned so that when it is deenergized the plunger 129 is disposed generally outwardly with respect thereto toward the extreme outer end of the tubular casing 131. Further, a substantially cup-shaped yoke 132 is arranged in surrounding relation with respect to the solenoid 18a; and an armature 133 is pivotally mounted upon a knife edge 134 carried by the yoke 132, the armature 133 being secured in place by a clip arrangement indicated at 135. Further, a bracket 136 is carried by the yoke 132 adjacent to the knife edge 134, and in turn supports a number of switch springs, including the individual switch springs 141, 142, 143 and 144, the switch springs 141 and 143 constituting movable switch springs connected to an insulating operating element 145 that bears against an operating arm 146 carried by the armature 133.

In the arrangement, the valve casing 121, the valve element 126 and the tubular casing 131 are formed of non-magnetic material, such, for example, as brass; whereas the valve stem 128, the plunger 129, the yoke 132 and the armature 133 are formed of magnetic material, such, for example, as soft iron. Furthermore, the inner end of the tubular casing 131 is hermetically sealed to the portion of the valve casing 121 surrounding the tubular extension 127 so as positively to prevent any water that might seep along the valve stem 128 from leaking to the exterior.

When the solenoid 18a is deenergized the plunger 129 is moved outwardly in the tubular casing 131 by the coil spring 130 so that the valve stem 128 moves the valve element 126 in to a closed position with respect to the valve port 125, thereby to cut-off the inlet port 122 from the outlet port 123, and the armature 133 is released so it is moved into its restored position by the resiliency of the switch springs 141 and 143 through the operating member 145 in order that the movable switch springs 141 and 143 disengage the respective stationary switch springs 142 and 144. Upon energization of the solenoid 18a, the plunger 129 is moved thereinto by the mechanical force produced by the magnetic flux, so that the valve stem 128 moves the valve element 126 with respect to the valve port 125 in order to place the inlet port 122 in communication with the outlet port 123. Also, the armature 133 is attracted by the yoke 132, incident to energization of the solenoid 18a, whereby the operating arm 146 actuates the movable switch springs 141 and 143 through the operating member 145 respectively to engage the stationary switch springs 142 and 144. The movement of the plunger 129 into the solenoid 118 compresses the coil spring 130 whereby upon subsequent deenergization of the solenoid 18a, the plunger 129 is restored into its normal position illustrated by the coil spring 130 effecting movement of the valve element 126 back into its closed position with respect to the valve port 125 and releasing the armature 133 so that it is moved back into its restored position illustrated by the resiliency of the movable switch springs 141 and 143. In the operation of the device 18, it will, of course, be appreciated that the movement of the plunger 129 into the solenoid 18a and the movement of the armature 133 toward the yoke 132, incident to the energization of the solenoid 18a, are effected by the mechanical forces tending to establish a minimum reluctance of the total magnetic path for the magnetic flux produced as a consequence of the energization of the solenoid 18*a*; which magnetic circuit includes the plunger 129, the armature 133, the yoke 132 and at least a portion of the valve stem 128. Accordingly, it will be understood that energization of the solenoid 18*a* effects both operation of the valve element 126 into its open position and operation of the switch springs 141 and 143 into their closed position.

Again referring to Fig. 3, the control circuit 100 further comprises a source of power supply of 118-volts A. C. and including two supply conductors 151 and 152 that are respectively grounded and ungrounded, as illustrated. One terminal of the door switch 103 is connected to the supply conductor 152 and the other terminal thereof is connected to a bus 153; the two individual switch springs of the set S1 are respectively connected to a bus 154 and to a conductor 155; the two individual switch springs of the set S2 are respectively connected to the bus 153 and to a conductor 156; the two individual switch springs of the set S3 are respectively connected to the bus 154 and to a conductor 157; the two individual switch springs of the set S4 are respectively connected to the bus 153 and to a conductor 158; the two individual switch springs of the set S5 are respectively connected to the bus 154 and to a conductor 159; the two individual switch springs of the set S6 are respectively connected to the busses 153 and 154; and the two individual switch springs of the set S7 are respectively connected to a conductor 160 and to the conductor 156. The solenoid or winding of the measuring coil 104 is connected across the conductors 155 and 158; and the measuring coil 104 is provided with a pair of contacts respectively connected to the conductor 156 and to a conductor 161, the contacts mentioned being governed by a contact bridging member 104*a*. The pump motor 22 is connected across the conductor 157 and the supply conductor 151; the main motor 16 is connected across the conductor 158 and the supply conductor 151; the heater 25 is connected across the conductor 159 and the supply conductor 151; the timer motor 107 and the pilot lamp 106 are connected in parallel relation across the bus 154 and the supply conductor 151; the contacts of the pushbutton switch 105 are respectively connected to the conductor 160 and to the bus 153; and the solenoid 18*a* is bridged across the conductor 161 and the supply conductor 151. Finally, the switch springs 141, 142, 143 and 144 respectively terminate the conductor 160, the bus 153, the bus 154 and the bus 153.

In the control circuit 100, when the program controller 101 occupies its normal or home position, the sets of switch springs S1, S2, S4 S5 and S6 occupy their open positions and the sets of switch springs S3 and S7 occupy their closed positions, the heater 25 is deenergized, the timer motor 107 and the pump motor 22 and the main motor 16 are deenergized, the pushbutton switch 105 occupies its open position, the solenoid 18*a* is deenergized so that the valve 18 occupies its closed position, and the measuring coil 104 is deenergized so that the bridge member 104*a* occupies its closed position. At this time, the position of the door switch 103 is governed by the position of the front door 13, the door switch 103 occupying its respective open and closed positions when the front door 13 occupies its respective open and closed positions. Finally, at this time the pilot lamp 106 is extinguished indicating that the control circuit 100 is at rest, and the indicia carried by the skirt 113 of the manual knob 102 cooperates with the index marker 114 to indicate that the program controller 101 occupies its off position.

The mode of operation of the dishwashing apparatus 10 and the time-sequence of operation of the elements incorporated in the control circuit 100 will best be understood in conjunction with the following description of the washing cycle of the apparatus 10, and it may be assumed that the dishes are supported by the rack structure, not shown, arranged in the vat 12, that a charge of a suitable detergent has been placed in the pocket 13*a* provided in the inner wall of the front door 13, and that the front door 13 occupies its closed position effecting operation of the door switch 103 into its closed position. At this time, the operator initiates the cycle of operation of the apparatus 10 merely by momentarily operating the pushbutton switch 105, whereby the bus 153 is connected to the conductor 160, the bus 153 being connected to the supply conductor 152 at this time by the door switch 103 in its closed position, so that a start circuit is completed for energizing the solenoid 18*a*. This circuit further includes the closed set of switch springs S7, the conductor 156,the contact bridging member 104*a*, the conductor 161 and the supply conductor 151, whereby the energized solenoid 18*a* effects opening of the valve 18 and closure of the switch springs 141 and 143 with respect to the switch springs 142 and 144 in the manner previously explained. The closure of the switch springs 141—142 completes a multiple path between the bus 153 and the conductor 160; whereby the subsequent release of the pushbutton 106 and the consequent operation thereof into its open position is without effect in the subsequent operation of the control circuit 100. At the switch springs 143—144 the bus 153 is connected to the bus 154, thereby to complete obvious multiple circuits for illuminating the pilot lamp 106 and for operating the timer motor 107, the illuminated pilot lamp 105 indicating that the washing cycle is in progress and the operating timer motor 107 effecting operation of the program controller 101 upon a timed basis in the manner previously explained. As noted above, the valve 18 is operated into its open position so that the water from the inlet conduit 17 is supplied to the spray device 20 and sprayed downwardly into the vat 12 through the dishes supported by tthe rack structure, not shown, and accumulates in the sump 15. When the bus 153 is connected at the switch springs 143—144 to the bus 154 a multiple circuit is completed for operating the pump motor 22; which circuit includes the closed set of switch springs S3; whereby the water accumulating in the sump 15 enters the drain pump 21 through the drain opening 15*a* and is pumped to the exterior by virtue of the operating pump motor 22. Specifically, the operating pump 21 delivers the water mentioned via the conduit 23 and the drain conduit 24 to the drain pumbing, not shown. Accordingly, at this time the water that is introduced into the vat 12 is discharged therefrom by the drain pump 21; which arrangement accommodates the discharge from the inlet conduit 17 into the drain conduit 24 of an initial quantity of water from the connecting hot water supply system, thereby eliminating this initial quantity of water that may be only tepid as a consequence of standing in the water supply system disposed between the hot water heater, not shown, and the dishwashing apparatus 10.

At the expiration of a time interval of 45 seconds, the timer motor 107 effects operation of the operating shaft 111 of the program controller 101, one step through the escapement mechanism 109 and the slip clutch 112; whereby the program controller 101 is driven out of its home position into its first control position, as indicated in Fig. 5; whereupon the sets of switch springs S2 and S6 are closed by the respective cams C2 and C6. The closure of the set of switch springs S2 completes a multiple holding circuit for energizing the solenoid 18*a* of the valve 18; this circuit including the supply conductor 151, the conductor 161, the contact bridging member 104*a*, the conductor 156, the closed set of switch springs S2, the bus 153, the door switch 103 and the supply conductor 152; thereby to maintain the valve 18 in its operated position, independently of the set of switch springs S7. The closure of the set of switch springs S6 connects the bus 153 to the bus 154, thereby to complete multiple circuits for operating the pump motor 22, for operating the timer motor 107 and for illuminating the run pilot lamp 106, independently of the operated position of the valve 18.

At the expiration of an additional time interval of 45 seconds, the operating shaft 111 of the program controller 101 is driven an additional step through the escapement mechanism 109 and the slip clutch 112; whereby the program controller 101 is driven out of its first control position and into its second control position; whereup the sets of switch springs S2, S3 and S7 are opened and the sets of switch springs S1 and S4 are closed. The opening of the set of switch springs S2 interrupts the previously mentioned holding circuit for energizing the solenoid 18*a* and the opening of the set of switch springs S7 interrupts the previously mentioned start circuit for energizing the solenoid 18*a*; whereby the solenoid 18*a* is deenergized effecting operation of the valve 18 back into its closed position, as well as opening of the sets of switch springs 141—142 and 143—144. The opening of the set of switch springs S3 interrupts the circuit for operating the pump motor 22, whereby further operation of the drain pump 21 is arrested at this time. The closure of the set of switch springs S4 completes a direct circuit for operating the main motor 16; this circuit including the supply conductor 151, the conductor 158, the closed set of switch springs S4, the bus 153, the door switch 103 and the supply conductor 152. Accordingly, operation of the main motor 16 is initiated so that the impeller 14 is rotated; however, without effect at this time since the water previously introduced into the vat 12 is removed from tthe sump 15 by the operating drain pump 21. The closure of the set of switch springs S1 prepares a circuit traced hereinafter for energizing in series the measuring coil 104 and the main motor 16.

In the next step of the program controller 101 the set of switch springs S2 is closed and the set of switch springs S4 is opened. The closure of the set of switch springs S2 completes the previously traced holding circuit for energizing the solenoid 18*a*, whereby the valve 18 is again operated into its open position in order again to supply water into the vat 12. At this time, the closure of the set of switch springs 141—142 is without effect, since the set of switch springs S7 occupies its open position; while the closure of the set of switch springs 143—144 is of no consequence by virtue of the closed position of the set of switch springs S6. The opening of the set of switch springs S4 interrupts the direct circuit for operating the main motor 16; whereby the previously mentioned series circuit, including the measuring coil 104 for operating the main motor 16 is completed. This circuit includes the supply conductor 151, the conductor 158, the conductor 155, the closed set of switch springs S1, the bus 154, the closed set of switch springs S6, the bus 153, the door switch 103 and the supply conductor 152. Accordingly, the measuring coil 104 is energized in series relation with the main motor 16; however, the measuring coil 104 is not operated at this time as it is of the marginal type so that the contact bridging member 104*a* remains in its restored position retaining energized the solenoid 18*a* of the valve 18. Hence at this time, hot water is supplied via the spray device 20 into the vat 12 and accumulates in the sump 15, since operation of the drain pump 21 is arrested; whereby the hot water accumulating in the sump 15 is caught-up by the impeller 14 and flung upwardly and outwardly in the vat 12 and through the dishes supported by the reticulated structure, not shown.

As the inlet valve 18 is retained in its open position, the amount of hot water accumulating in the sump 15 increases, thereby imposing a greater load upon the impeller 14 and consequently upon the main motor 16; whereby the operating current thereof is increased with the result that this operating current traversing the measuring coil 104 tends to effect operation thereof; and ultimately, when a predetermined quantity of hot water is accumulated in the sump 15 and constituting a full charge, the load imposed upon the impeller 14 and consequently upon the main motor 16 is such that the operating current traversing the measuring coil 104 is sufficient to effect operation thereof. Upon operating the measuring coil 104 actuates the contact bridging member 104*a* into its open position to interrupt the circuit for energizing the solenoid 18*a* with the result that the inlet valve 18 is returned into its closed position to cut-off the further supply of hot water from the inlet conduit 17 to the spray device 20 and thus into the vat 12.

At this time, the first washing cycle is underway and when an adequate amount of wash water has accumulated into the sump 15, and sometime before the accumulation of the full charge of wash water in the sump 15, as described above, the upwardly directed hot water in the vat 12 returns along the inner wall of the front door 13 and into the pocket 13*a* so as to bring about the washing of the charge of detergent therefrom into the charge of wash water so that the washing of the dishes proceeds with the hot water containing the charge of detergent.

In the next step of the operating shaft 111, the set of switch springs S5 is closed, as indicated in Fig. 5, thereby to complete a circuit for energizing the heater 25; which circuit includes the supply conductor 151, the conductor 159, the closed set of switch springs S5, the bus 154, the closed set of switch springs S6, the bus 153, the door switch 103 and the supply conductor 152. Accordingly, at this time, the heat generated by the heater 25 is supplied to the charge of wash water in the vat 12 by virtue of the fact that the wash water comes in contact therewith as it is thrown about in the vat 12 by operation of the impeller 14; and in passing, it is mentioned that the normal level of the wash water contained in the sump 15 is in fact well below the horizontal position of the heater 25. This addition of heat to the wash water in the vat 12 prevents the normal tendency of cooling thereof as a consequence of the finely divided condition thereof produced by operation of the impeller 14.

In the next step of the operating shaft 111, the set of switch springs S2 is opened thereby further to interrupt the previously traced circuit for energizing the solenoid 18*a* of the valve 18 so as positively to insure that the valve 18 is returned into its closed position independently of the operated condition of the measuring coil 104, thereby positively to insure that the maximum charge of wash water into the vat 12 is not greater than a predetermined amount, in the event of failure of operation of the measuring coil 104; which predetermined amount corresponds to that which may flow through the spray device 20 in the two steps of the program controller 101 during which the set of switch springs S2 is closed, as previously explained.

The first washing step proceeds through a plurality of steps of the program controller 101, as indicated in Fig. 5, whereupon in the tenth step thereof the sets of switch springs S1 and S5 are opened, and the set of switch springs S3 is closed. The opening of the set of switch springs S1 interrupts the series circuit for energizing the measuring coil 104 and for operating the main motor 16; whereby the contact bridging member 104*a* is reclosed and operation of the main motor 16 is arrested to stop the impeller 14 at this time. The opening of the set of switch springs S5 interrupts the circuit for energizing the heater 25; and the closure of the set of switch springs S3 completes the circuit for operating the pump motor 22 so that the drain pump 21 is operated to effect the discharge of the wash water from the sump 15 into the drain conduit 24, in the manner previously explained.

In the eleventh step of the program controller 101, the sets of switch springs S1 and S4 are reclosed and the set of switch springs S3 is opened. The opening of the set of switch springs S3 arrests operation of the pump motor 22 and consequently of the drain pump 21; the closure of the set of switch springs S4 completes the previously traced direct circuit for operating the main mootr 16; whereas the closure of the set of switch springs S1 prepares the series circuit for operating the main motor 16 via the measuring coil 104. Thus at this time, operation of the main motor 16 is resumed, whereby the impeller 14 is again operated.

In the twelfth step of the program controller 101, the set of switch springs S2 is closed and the set of switch springs S4 is opened. The closure of the set of switch springs S2 effects energization of the solenoid **18*a* so that the valve 18 is again operated into its open position bringing about the supply of hot water into the vat 12; and opening of the set of switch springs S4 removes the short-circuit around the measuring coil 104 so that at this time the main motor 16 and the measuring coil 104 are energized in series relation. Accordingly, at this time the measuring coil 104 again meters the quantity of hot water that is supplied into the vat 12 and is ultimately operated to effect deenergization of the solenoid 18*a* and the consequent return of the inlet valve 18** back into its closed position, in the manner previously explained.

In the thirteenth step of the program controller 101, the set of switch springs S5 is reclosed so as again to effect energization of the heater 25 and the consequent supply of heat to the present charge of wash water being introduced into the vat 12. In the fourteenth step of the program controller 101, the set of switch springs S2 is opened, in order to insure the return of the inlet valve 18 into its closed position, in the manner previously explained. This second washing step proceeds in the manner previously explained until the program controller 101 is driven into its eighteenth step effecting opening of the sets of switch springs S1 and S5 and closing of the set of switch springs S3, whereby operation of the main motor 16 is arrested and energization of the heater 25 is terminated and operation of the pump motor 22 is again initiated so as to bring about the discharge of the wash water into the drain conduit 24, in the manner previously explained.

As illustrated in Fig. 5, the dishwashing apparatus 10 proceeds through a third washing step in the nineteen through the twenty-three steps of the program controlled 101, and then proceeds through a fourth washing step in the twenty-four through the twenty-eight steps of the program controller 101; which third and fourth washing steps are entirely similar to the first and second washing steps described in detail above, but are of slightly shorter time duration as indicated.

Accordingly, in the twenty-ninth step of the program controller 101, only the sets of switch springs S4 and S6 are closed, whereby the main motor 16 and the timer motor 107 are operated; and of course the timer 107 is operated and the run pilot lamp 106 is illuminated. In the thirtieth step of the program controller 101, the set of switch springs S5 is closed so that the heater 25 is again energized. At this time the air in the vat 12 is circulated by the operating impeller 14 through the dishes supported by the reticulated structure, not shown, and over the energized heater 25; whereby the dishes are subjected to a drying action by a blast of hot air. The above described drying step proceeds through a time interval and until the program controller 101 is driven into its fifty-ninth step; whereupon the set of switch springs S4 is opened to arrest operation of the main motor 16. Accordingly at this time, the supported dishes are merely heated by the energized heater 25 to effect further drying thereof, and without the blast of hot air, since the impeller 14 is not further operated. This static drying step proceeds through the remainder of the cycle of the program controller 101, as explained more fully below; and when the program controller 101 is driven into its seventieth step, the set of switch springs S7 is reclosed. This reclosure of the set of switch springs S7 is without immediate effect; however, it prepares the control circuit 100 for the next cycle of operation thereof so as to condition and render effective the next operation of the pushbutton 105.

The static heating step mentioned above proceeds until the program controller 101 is driven into its seventy-second step, that also comprises its home or zero position; whereupon the sets of switch springs S5 and S6 are opened. The opening of the set of switch springs S5 interrupts the circuit for energizing the heater 25; whereas the opening of the set of switch springs S6 disconnects the bus 153 from the bus 154 with the result that further operation of the timer motor 107 is arrested and the run pilot lamp 106 is extinguished so as to indicate that the composite cycle of the dishwashing apparatus 10 has been completed. At this time, the control circuit 100 occupies its initial condition; whereby the operator may subsequently open the front door 13 and remove the rack structure, not shown, thereover to effect the removal of the dishes.

When the front door 13 is operated into its open position, the door switch 103 is operated into its open position so as to disconnect the supply conductor 152 from the bus 153 in order positively to prevent operation of the control circuit 100 at this time.

In the next cycle of operation of the dishwashing apparatus 10, the return of the front door 13 into its closed position again operates the door switch 103 into its closed position so as again to render effective the pushbutton 105; whereby the cycle of the dishwashing apparatus 10 may be again initiated in response to momentary operation of the pushbutton 105, in the manner explained above.

Turning now to the modified form of the control circuit 600 as shown in Fig. 6, and also embodying the features of the present invention, the arrangement comprises a manual and automatic pushbutton switch 605 that has been substituted for the simple manually operated pushbutton switch 105, and further comprises combined pressure responsive and temperature responsive apparatus 630 and a selector switch 650; which elements have been incorporated into the fundamental control circuit 100 of Fig. 3, as explained more fully below. More particularly, the pushbutton switch 605 comprises a manually operable pushbutton 606 carried by an operating plunger 607 that is operatively associated with a set of switch springs including three individual switch springs 608, 609 and 610. Also the plunger 607 is provided with a dog 611 that cooperates with a thermally controlled latch 612 of the bimetallic element type, the thermal element 612 being provided with an associated electric heater 613, as well as a biasing arrangement including a coil spring 614. The coil spring 614 extends between the thermal element 612 and a manually adjustable knob 615 carried by an associated support; whereby the initial bias applied to the thermal element 612 may be selectively set by adjustment of the knob 615. In the arrangement, the individual switch springs 608, 609 and 610 normally occupy their open positions and the resiliency of the switch spring 608 returns the plunger 607 into its projected position. The switch spring 608 terminates the bus 153; the switch spring 609 terminates the conductor 160; and the switch spring 610 terminates a conductor 616; while the electric heater 613 is bridged across the conductor 616 and the supply conductor 151.

The apparatus 630 essentially comprises a casing 631 arranged in the conduit 19 between the outlet port of the valve 18 and the spray device 20, as illustrated; which casing 631 further comprises a bellows-like element 632 forming a portion of the wall thereof and responsive to the pressure of the water therein. The bellows 632 carries an operating rod 633 that, in turn, carries a contact bridging member 634 provided with a pair of contacts. In the arrangement, the resiliency of the bellows 632 normally urges the contact bridging member 634 into an open position with respect to the associated pair of contacts; and a bias is applied to the contact bridging member 633 by a coil spring 635 extending between the contact bridging member 634 and a rotary knob 636 carried by an associated support; whereby the bias applied to the contact bridging member 634 may be adjustably set by the knob 636.

Also a thermal responsive element 637 is arranged within the casing 631 and connected via a capillary tube 638 to an expansible bellows 639, the elements comprising a thermal system containing a suitable fluid, not shown. In turn, the expansible bellows 639 carries a contact bridging member 640 that cooperates with an associated pair of contacts; and the contact bridging member 634 is provided with a biasing arrangement including a coil spring 641. The coil spring 641 extends between the contact bridging member 640 and a rotatable knob 642 that is carried by an associated support; whereby the initial bias applied to the contact bridging member 640 may be selectively set by the knob 642.

The selector switch 650 comprises an operating shaft 651 carrying on the outer end thereof a manual dial 652 provided with indicia that cooperates with an associated index marker 653; and the operating shaft 651 carries on the inner end thereof a wiper 654 that cooperates with four conducting segments 655, 656, 657 and 658. The dial 652 carries four sets of indicia respectively corresponding to: (1) both temperature control and pressure control; (2) only temperature control; (3) only pressure control; and (4) neither temperature control nor pressure control.

In the circuit arrangement, the two contacts controlled by the contact bridging member 634 respectively terminate the bus 153 and a conductor 602; the two contacts controlled by the contact bridging member 640 respectively terminate the conductors 602 and 160; and the conducting segments 655, 656, 657 and 658 respectively terminate the bus 153, the conductor 160, a conductor 601 and the conductor 602. The switch springs 141, 142, 143 and 144 that are operated by the solenoid 18*a* of the valve 18 respectively terminate the conductor 601, the bus 153, the bus 154 and the bus 153.

Considering now the general mode of operation of this modified form of the control circuit 600, it is first noted that when the manual dial 652 occupies its position wherein the legend "neither temperature nor pressure" cooperates with the index marker 653, the operation is identical to that of the control circuit 100 previously described. This circumstance flows from the fact that in this position of the manual dial 652, the wiper 654 bridges together the conducting segments 656 and 657 thereby connecting together the conductors 160 and 601 so that in fact the conductor 160 is directly connected to the switch spring 141 controlled by the solenoid 18*a*; which is precisely the connection of the control circuit 100.

On the other hand, when the manual dial 652 occupies other than its position mentioned above, the controls are determined by the apparatus 630, as explained more fully hereinafter, by virtue of the fact that the conductor 601 is not directly connected to the conductor 160.

Now assuming that the manual dial 652 occupies its position illustrated, wherein the legend "both temperature and pressure" cooperates with the index marker 653; whereby the wiper 654 engages only the conducting segment 658 thereby rendering the apparatus 630 both pressure and temperature responsive.

In this case, when the pushbutton 606 is manually operated, the plunger 607 moves the switch spring 608 into engagement with the switch spring 609; whereby the switch spring 609 engages the switch spring 610 so that the bus 153 is mutually connected to the conductors 160 and 616. This connection of the conductor 153 to the conductor 616 completes an obvious circuit including the supply conductor 151 for energizing the heater 613. Also as the plunger 607 is thus depressed, the dog 611 carried thereby rides under the latch carried by the thermal element 612 so that the pushbutton switch 605 remains in its closed position after the release of the pushbutton 606; however, the heater 613 heats the thermal element 612 so that it is deflected away from the plunger 607 as time proceeds; whereby ultimately the latch carried by the thermal element 612 disengages the dog 611 carried by the plunger 607 so that the plunger 607 is returned back into its projected position by the resiliency of the switch spring 608. Thus the pushbutton 606 is returned back into its normal projected position effecting the disengagement of the switch springs 608, 609 and 610; whereby the pushbutton switch 605 occupies its open position. When the switch spring 609 disengages the switch spring 610, the circuit for energizing the heater 613 is arrested; whereby the thermal element 612 subsequently cools in order to return the latch carried thereby into cooperative relation with respect to the dog 611 carried by the plunger 607 so as to reset the latch mechanism for the next operation of the pushbutton switch 605. In view of the foregoing, it will be understood that incident to manual operation of the pushbutton switch 605 from its open position into its closed position, the automatic thermal arrangement is set; whereby the pushbutton switch 605 is subsequently automatically returned from its closed position back into its open position after a predetermined time interval; which predetermined time interval may be variably set by adjustment of the manual knob 615.

During the predetermined time interval that the pushbutton switch 605 occupies its closed position, as explained above, the bus 153 connected via the switch springs 608 and 609 to the conductor 160, thereby to effect energization of the solenoid 18*a* via the circuit elements including the closed set of switch springs S7, the conductor 156, the contact bridging member 194*a* and the supply conductor 151, as well as the door switch 103 and the supply conductor 152. Accordingly, the valve 18 is operated into its open position so that the water supplied from the inlet conduit 17 via the conduit 19 to the spray device 20, and thus into the vat 12, traverses the casing 631 of the apparatus 630 so as to control both the bellows 632 and the thermal element 637. Also, when the solenoid 18*a* is energized, the sets of switch springs 141—142 and 143—144 are operated, as previously explained. Operation of the set of switch springs 141—142 is without effect in the present example by virtue of the position of the manual dial 652; whereby the usual holding circuit is not completed between the bus 153 and the conductor 160. On the other hand, operation of the set of switch springs 143—144 is effective to connect the bus 153 to the bus 154, thereby to complete the previously traced circuit for operating the pump motor 22 so as to remove to the exterior via the drain conduit 24 the water that is introduced into the vat 12 by the spray device 20 at this time. Also the connection of the bus 153 to the bus 154 at the contacts 143—144 completes the previously traced circuits for initiating operation of the timer motor 107 and for illuminating the run pilot lamp 106.

While operatiton of the timer motor 107 is initiated at this time as noted above, the operating shaft 111 is not immediately driven out of its home position since the drive includes the escapement mechanism 109, and the timer motor 107 must operate throughout a time interval of 45 seconds in order to bring about one step of operation of the operating shaft 111 of the program controller 101 as previously explained and as illustrated in Fig. 5. Now the normal time interval during which the pushbutton switch 605 occupies its closed position is shorter than this 45 seconds time interval, whereby alternative circuits must be completed by the device 630 during this test time interval of 45 seconds while the program controller 101 occupies its home position with the timer motor 107 operating, as explained below.

More particularly, in the event the pressure of the water in the inlet conduit 17 is adequate, there will be adequate pressure in the casing 631 of the device 630 and the water at an adequate rate will be supplied via the spray device 20 in the vat 12; whereby this adequate pressure of the water in the casing 631 will effect operation of the bellows 632 so that it collapses sufficiently that the contact bridging member 634 engages the associated pair of contacts so as to connect the bus 153 to the conductor 602.

Also in the event that the water supplied from the inlet conduit 17 to the spray device 20 has an adequate temperature, the thermal element 637 will be governed in order to bring about expansion of the bellows 639 adequately to operate the contact bridging member 640 into engagement with the associated contacts so as to connect the conductor 602 to the bus 160.

Accordingly, in the dual events described above, the bus 153 is connected via the contact bridging member 634, the conductor 602 and the contact bridging member 640 to the bus 160 thereby to complete a bypass around the pushbutton switch 605 so that the subsequent return of the pushbutton switch 605 from its closed position back into its open position is not effective to interrupt the previously traced circuits for energizing the solenoid 18*a*, for operating the pump motor 22, for operating the timer motor 107 and for illuminating the run pilot lamp 106; whereby the return of the pushbutton switch 605 into its open position is without effect. Thus in these dual events, and after the expiration of a total time interval of 45 seconds, the escapement mechanism 109 drives the operating shaft 111 out of its home position in its first step so that the set of switch springs S6 is closed effecting the completion of a direct connection between the buses 153 and 154; whereby the continued operation of the circuit 600 through its complete cycle is independent of the subsequent control of the apparatus 630.

On the other hand, in the present example, in the event of either an inadequate pressure or an inadequate temperature of the water in the inlet conduit 17, one or the other of the contact bridging members 634 and 640 will not be operated into its closed position with respect to its associated contacts; whereby there will not be an alternative connection between the bus 153 and the conductor 160 when the pushbutton switch 605 is returned into its open position. Thus in this case, the removal of voltage from the conductor 160 brings about the deenergization of the solenoid 18*a* with the consequent result that the inlet valve 18 is returned back into its closed position and the sets of switch springs 141—142 and 143—144 are opened. The opening of the set of switch springs 143—144 interrupts the connection between the buses 153 and 154 thereby to effect arresting of the operation of the pump motor 22 and the timer motor 107, as well as extinguishing of the run pilot lamp 106. Hence the operation of the control circuit 100 is arrested before the timer motor 107 can operate the operating shaft 111 of the program controller 101 out of its home position. Accordingly, in the present example, the control circuit 100 is not operated through its complete cycle in response to the operation of the pushbutton switch 605 as a consequence of the non-standard condition of the water in the inlet conduit 17 in that the pressure thereof is too low or the temperature thereof is too low as determined by the apparatus 630 in the initial test period of the push-button switch 605.

When the manual dial 652 occupies its "temperature only" position the operation of the circuit 600 is quite similar to that described above, except that in this case the wiper 654 bridges the conducting segments 655 and 658 completing a connection between the bus 153 and the conductor 602 thereby rendering ineffective the corresponding contact bridging member 634 governed by the pressure responsive bellows 632; whereby in this example, the apparatus 630 is operative only to determine the adequacy of the temperature of the water supplied from the inlet conduit 17 into the vat 12. Accordingly in this case, the complete cycle of the circuit 600 is initiated in response to operation of the pushbutton 605 into its closed position in the event the temperature of the water supplied to the vat 12 is adequate; and otherwise, the cycle of the circuit 600 is arrested before the program controller 101 is operated out of its home position, as previously explained.

When the manual dial 652 occupies its "pressure only" position the operation of the circuit 600 is quite similar to that described above, except that in this case the wiper 654 bridges the conducting segments 656 and 658 completing a connection between the conductors 160 and 602 thereby rendering ineffective the corresponding contact bridging member 640 governed by the temperature responsive bellows 639. In this example, the apparatus 630 is operative only to determine the adequacy of the pressure of the water supplied from the inlet conduit 17 into the vat 12. Accordingly, in this case, the complete cycle of the circuit 600 is initiated in response to operation of the pushbutton 605 into its closed position in the event the pressure of the water supplied to the vat 12 is adequate; and otherwise, the cycle of the circuit 600 is arrested before the program controller 101 is operated out of its home position, as previously explained.

In the circuit arrangement, the delay or test period of the pushbutton switch 605 may be set by the manual knob 615 in the variable range 15 to 30 seconds; which time interval is well within the time interval of 45 seconds of the first step of the program controller 101 out of its home position. Similarly the control pressure of the pressure responsive bellows 632 may be set by the manual knob 636 in the variable range 10 to 20# per square inch gauge pressure; and the control temperature of the temperature responsive bellows 639 may be set by the manual knob 642 in the variable range 110° to 140° F. As a matter of optimum values, it is recommended that the pressure responsive bellows 632 be set by the manual knob 636 to a gauge pressure of $15\#/in^2$ and that the temperature responsive bellows 639 be set by the manual knob 642 to a temperature of 120° F. Ordinarily the settings of the manual knobs 615, 636 and 642 comprise factory adjustments; while the setting of the manual dial 652 may suitably comprise an adjustment made by the mechanic who makes the installation of the dishwashing apparatus 10 upon the premises of the purchaser. However, the matter of the setting of these controls is not critical and may be left to the discretion of the purchaser of the dishwashing apparatus 10, if desired.

In view of the foregoing, it is apparent that there has been provided in dishwashing apparatus an improved control circuit incorporating an instant start arrangement that is governed by a manually operable pushbutton, or the like; which start arrangement may also incorporate improved facility for delaying the determination of the complete cycle of the dishwashing apparatus depending upon certain standard conditions of the water that is supplied to the vat thereof, so as to insure that the water thus supplied is of either or both a proper pressure and a proper temperature, as desired.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In dishwashing apparatus including a vat adapted to receive dishes to be washed, an inlet conduit communicating with said vat and adapted to be connected to a water supply system, first mechanism selectively operative to control the introduction of water into said vat via said inlet conduit, an outlet conduit communicating with said vat and adapted to be connected to drain plumbing, second mechanism selectively operative to control the removal of water from said vat via said outlet conduit, third mechanism selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said first mechanism and said second mechanism and said third mechanism in a given sequence in order to produce a given washing cycle in said vat; the control circuit combination comprising a start circuit for operating said program controller, a run circuit for operating said program controller, an electro-responsive device operative to effect operation of said first mechanism so as to introduce water into said vat, a pick-up circuit for operating said device, a hold circuit for operating said device, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, a manually operable start member operative to complete said prepared pick-up circuit, and means controlled by operation of said device for completing both said prepared start circuit and said prepared hold circuit.

2. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a start circuit for operating said program controller, a run circuit for operating said program controller, an electro-responsive element operative to effect operation of said valve into its open posittion so as to introduce water into said vat, a pick-up circuit for operating said element, a hold circuit for operating said element, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, a manually operable start member operative to complete said prepared pick-up circuit, and means controlled by operation of said element for completing both said prepared start circuit and said prepared hold circuit.

3. The dishwashing apparatus control circuit combination set forth in claim 2, wherein said manually operable start member is essentially a pushbutton switch.

4. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a start circuit for operating said program controller, a run circuit for operating said program controller, a solenoid effective when energized to operate said valve into its open position so as to introduce water into said vat, a pick-up circuit for energizing said solenoid, a hold circuit for energizing said solenoid, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, a manually operable start member operative to complete said prepared pick-up circuit, and switching means controlled by energization of said solenoid for completing both said prepared start circuit and said prepared hold circuit.

5. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, a pump selectively operative to control the removal of water from said vat via said outlet conduit, an impeller selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said pump and said impeller in a given sequence in order to produce a given washing cycle in said vat; the control circuit combination comprising a start circuit for operating said program controller, a run circuit for operating said program controller, an electro-responsive element operative to effect operation of said valve into its open position so as to introduce water into said vat, a pick-up circuit for operating said element, a hold circuit for operating said element, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, a manually operable start member operative to complete said prepared pick-up circuit, means controlled by operation of said element for completing both said prepared start circuit and said prepared hold circuit, and means controlled jointly by operation of said element and by said program controller in its home position for operating said pump to effect the removal of water from said vat.

6. In dishwashing apparatus including a vat adapted to receive dishes to be washed, an inlet conduit communicating with said vat and adapted to be connected to a water supply system, first mechanism selectively operative to control the introduction of water into said vat via said inlet conduit, an outlet conduit communicating with said vat and adapted to be connected to drain plumbing, second mechanism selectively operative to control the removal of water from said vat via said outlet conduit, third mechanism selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said first mechanism and said second mechanism and said third mechanism in a given sequence in order to produce a given washing cycle in said vat; the control circuit combination comprising a start circuit for operating said program controller, a run circuit for operating said program controller, an electro-responsive element operative to effect operation of said first mechanism so as to introduce water into said vat, a pick-up circuit for operating said element, a hold circuit for operating said element, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, said program controller being characterized by a delay of a first time interval in its operation out of its home position following completion of said start circuit, a start switch havnig a restored position interrupting said pick-up circuit and an operated position completing said prepared pick-up circuit, a manually operable start member for actuating said start switch form its restored position into its operated position, timing means for returning said start switch from its operated position back into its restored position after a delay of a second time interval following operation thereof, means controlled by operation of said element for completing said prepared start circuit and for further preparing said prepared hold circuit, apparatus operated in response to a predetermined pressure of the water introduced into said vat, and means controlled by operation of said apparatus for completing said further prepared hold circuit, said second time interval being shorter than said first time interval so that said program controller is not operated out of its home position incident to operation of said start member in the event the pressure of the water introduced into said vat is below said predetermined pressure.

7. In dishwashing apparatus including a vat adapted to receive dishes to be washed, an inlet conduit communicating with said vat and adapted to be connected to a hot water supply system, first mechanism selectively operative to control the introduction of water into said vat via said inlet conduit, an outlet conduit communicating with said vat and adapted to be connected to drain, plumbing, second mechanism selectively operative to control the removal of water from said vat via said outlet conduit, third mechanism selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said first mechanism and said second mechanism and said third mechanism in a given sequence in order to produce a given washing cycle in said vat; the control circuit combination comprising a start circuit for operating said program controller, a run circuit for operating said program controller, an electro-responsive element operative to effect operation of said first mechanism so as to introduce water into said vat, a pick-up circuit for operating said element, a hold circuit for operating said element, means controlled by operation of said program controller into its home position for preparing said start circuit and for interrupting said run circuit and for preparing both said pick-up circuit and said hold circuit and controlled by operation of said program controller out of its home position for interrupting said start circuit and for completing said run circuit and for interrupting both said pick-up circuit and said hold circuit, said program controller being characterized by a delay of a first time interval in its operation out of its home position following completion of said start circuit, a start switch having a restored position interrupting said pick-up circuit and an operated position completing said prepared pick-up circuit, a manually operable start member for actuating said start switch from its restored position into its operated position, timing means for returning said start switch from its operated position back into its restored position after a delay of a second time interval following operation thereof, means controlled by operation of said element for completing said prepared start circuit and for further preparing said prepared hold circuit, apparatus operated in response to a predetermined temperature of the water introduced into said vat, and means controlled by operation of said apparatus for completing said further prepared hold circuit, said second time interval being shorter than said first time interval so that said program controller is not operated out of its home position incident to operation of said start member in the event the temperature of the water introduced into said vat is below said predetermined temperature.

8. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a control switch, a single solenoid effective when energized to operate said valve into its open position so as to introduce water into said vat and to operate said control switch into its closed position, means responsive to operation of said control switch into its closed position for effecting operation of said program controller through its given timed cycle, and means including a manually operable start member for effecting energization of said solenoid.

9. The dishwashing apparatus control circuit combination set forth in claim 8, wherein said valve is provided with a casing supporting both said solenoid and said control switch so as to provide a composite assembly.

10. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a first control switch, a single solenoid effective when energized to operate said valve into its open position so as to introduce water into said vat and to operate said first control switch, a second control switch, means responsive to a predetermined pressure of the water introduced into said vat for operating said second control switch, means controlled by the concurrent operations of said first control switch and said second control switch for effecting operation of said program controller through its given timed cycle, and means including a manually operable start member for effecting energization of said solenoid.

11. In dishwashing apparatus including a vat adapted to receive dishes to be washed, an inlet conduit communicating with said vat and adapted to be connected to a hot water supply system, a valve selectively operative to control the introduction of water into said vat via said inlet conduit, an outlet conduit communicating with said vat and adpted to be connected to drain plumbing, mechanism selectively operative to control the removal of water from said vat via said outlet conduit, a device selectively operative to wash dishes arranged in said vat, an electro-responsive program controller having a home position and a plurality of control positions and opertaive in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a first control switch, a single solenoid effective when energized to operate said valve into its open position so as to introduce water into said vat and to operate said first control switch, a second control switch, means responsive to a predetermined temperature of the water introduced into said vat for operating said second control switch, means controlled by the concurrent operations of said first control switch and said second control switch for effecting operation of said program controller through its given timed cycle, and means including a manually operable start member for effecting energization of said solenoid.

12. In dishwashing apparatus including a vat adapted to receive dishes to be washed, an inlet conduit communicating with said vat and adapted to be connected to a hot water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a first control switch, a single solenoid effective when energized to operate said valve into its open position so as to introduce water into said vat and to operate said first control switch, a second control switch, means responsive to a predetermined pressure of the water introduced into said vat for operating said second control switch, a third control switch, means responsive to a predetermined temperature of the water introduced into said vat for operating said third control switch, means controlled by the concurrent operations of said first control switch and said second control switch and said third control switch for effecting operation of said program controller through its given timed cycle, and means including a manually operable start member for effecting energization of said solenoid.

13. In dishwashing apparatus including a vat adapted to receive dishes to be washed, an inlet conduit communicating with said vat and adapted to be connected to a hot water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a first control switch, a single solenoid effective when energized to operate said valve into its open position so as to introduce water into said vat and to operate said first control switch, a second control switch, means responsive to a predetermined pressure of the water introduced into said vat for operating said second control switch, a third control switch, means responsive to a predetermined temperature of the water introduced into said vat for operating said third control switch, manually operable means for selecting either one or both of said second control switch and said third control switch, means controlled jointly by the operation of said first control switch and by the operation of said selected one or both of said second control switch and said third control switch for effecting operation of said program controller through its given timed cycle, and means including a manually operable start member for effecting energization of said solenoid.

14. In dishwashing apparatus including a vat adapted to receive dishes to be washed, an inlet conduit communicating with said vat and adapted to be connected to a water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device in a given sequence in order to produce a given washing cycle in said vat; the control circuit combination comprising a first circuit for operating said program controller, said program controller being characterized by a delay of a first time interval in its operation out of its home position following completion of said first circuit, a control switch having a closed position completing said first circuit, a single solenoid effective when energized to operate said valve into its open position so as to introduce water into said vat and to operate said control switch into its closed position, a second circuit for energizing said solenoid, a start switch having a restored position interrupting said second circuit and an operated position completing said second circuit, a manually operable start member for actuating said start switch from its restored position into its operated position, timing means for returning said start switch from its operated position back into its restored position after a delay of a second time interval following operation thereof, apparatus operated in response to a predetermined pressure of the water introduced into said vat, and means responsive to operation of said apparatus for energizing said solenoid independently of the operated position of said start switch, said second time interval being shorter than said first time interval so that said program controller is not operated out of its home position incident to operation of said start member in the event the pressure of the water introduced into said vat is below said predetermined pressure.

15. In dishwashing apparatus including a vat adapted to receive dishes to be washed, an inlet conduit communicating with said vat and adapted to be connected to a hot water supply system, a valve selectively operative to control the introduction of water into said vat via said inlet conduit, an outlet conduit communicating with said vat and adapted to be connected to drain plumbing, mechanism selectively operative to control the removal of water from said vat via said outlet conduit, a device selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said valve and said mechanism and said device ing a given sequence in order to produce a given washing cycle in said vat; the control circuit combination comprising a first circuit for operating said program controller, said program controller being characterized by a delay of a first time interval in its operation out of its home position following completion of said first circuit, a control switch having a closed position completing said first circuit, a single solenoid effective when energized to operate said valve into its open position so as to introduce water into said vat and to operate said control switch into its closed position, a second circuit for energizing said solenoid, a start switch having a restored position interrupting said second circuit and an operated position completing said second circuit, a manually operable start member for actuating said start switch from its restored position into its operated position, timing means for returning said start switch from its operated position back into its restored position after a delay of a second time interval following operation thereof, apparatus operated in response to a predetermined temperature of the water introduced into said vat, and means responsive to operation of said apparatus for energizing said solenoid independently of the operated position of said start switch, said second time interval being shorter than said first time interval so that said program controller is not operated out of its home position incident to operation of said start member in the event the temperature of the water introduced into said vat is below said predetermined temperature.

16. In dishwashing apparatus including a vat adapted to receive dishes to be washed, an inlet conduit communicating with said vat and adapted to be connected to a water supply system, first mechanism selectively operative to control the introduction of water into said vat via said inlet conduit, an outlet conduit communicating with said vat and adapted to be connected to drain plumbing, second mechanism selectively operative to control the removal of water from said vat via said outlet conduit, third mechanism selectively operative to wash dishes arranged in said vat, an electro-responsive program controller having a home position and a plurality of control positions and operative in a given timed cycle from its home position through its control positions and back into its home position, and means selectively governed by operation of said program controller through its control positions for selectively operating said first mechanism and said second mechanism and said third mechanism in a given sequence in order to produce a given washing cycle in said vat; the control circuit combination comprising a solenoid effective when energized to operate said valve into its open position so as to introduce water into said vat, a start switch having an operated position effecting energization of said solenoid and a restored position effecting deenergization of said solenoid, a manually operable start member for actuating said start switch from its restored position into its operated position, timing means for returning said start switch from its operated position back into its restored position a short time interval after actuation thereof, and apparatus responsive to a predetermined pressure of the water introduced into said vat for effecting operation of said program controller through its given timed cycle.

References Cited in the file of this patent

UNITED STATES PATENTS

| | | |
|---|---|---|
| 2,155,868 | Pauly | Apr. 25, 1939 |
| 2,217,705 | Rataiczak | Oct. 15, 1940 |
| 2,624,352 | Illian | Jan. 6, 1953 |
| 2,710,010 | Lengvenis | June 7, 1955 |